United States Patent
Maroney et al.

(10) Patent No.: US 10,956,344 B2
(45) Date of Patent: *Mar. 23, 2021

(54) PROVIDING INFORMATION FOR A CONTROLLER MEMORY BUFFER ELASTICITY STATUS OF A MEMORY SUB-SYSTEM TO A HOST SYSTEM

(71) Applicant: Micron Technology, Inc., Boise, ID (US)

(72) Inventors: John Maroney, Irvine, CA (US); Paul Suhler, Austin, TX (US); Lyle Adams, San Jose, CA (US); David Springberg, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,847

(22) Filed: Apr. 30, 2020

(65) Prior Publication Data

US 2020/0257638 A1  Aug. 13, 2020

Related U.S. Application Data

(63) Continuation of application No. 16/236,922, filed on Dec. 31, 2018, now Pat. No. 10,657,078.

(60) Provisional application No. 62/752,766, filed on Oct. 30, 2018.

(51) Int. Cl.
*G06F 12/00* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 5,706,034 A | 1/1998 | Katsura et al. |
| 7,573,821 B2 * | 8/2009 | Chilukoor ............... H04L 47/10 370/235 |
| 2008/0313368 A1 | 12/2008 | Kuo et al. |
| 2015/0301754 A1 | 10/2015 | Kochar et al. |

(Continued)

FOREIGN PATENT DOCUMENTS

WO    2018076793 A1    5/2018

OTHER PUBLICATIONS

International Search Report and Written Opinion dated Feb. 12, 2020, on application No. PCT/US2019/058662.

*Primary Examiner* — Cheng Yuan Tseng
(74) *Attorney, Agent, or Firm* — Lowenstein Sandler LLP (57) ABSTRACT

An indication of a capacity of a CMB elasticity buffer and an indication of a throughput of one or more memory components associated with the CMB elasticity buffer can be received. An amount of time for data at the CMB elasticity buffer to be transmitted to one or more memory components can be determined based on the capacity of the CMB elasticity buffer and the throughput of the one or more memory components. Write data can be transmitted from a host system to the CMB elasticity buffer based on the determined amount of time for data at the CMB elasticity buffer to be transmitted to the one or more memory components.

20 Claims, 6 Drawing Sheets

(56) References Cited

U.S. PATENT DOCUMENTS

2016/0371026 A1    12/2016   Shim et al.
2018/0275872 A1     9/2018   Benisty et al.

* cited by examiner

PROVIDING INFORMATION FOR A CONTROLLER MEMORY BUFFER ELASTICITY STATUS OF A MEMORY SUB-SYSTEM TO A HOST SYSTEM

RELATED APPLICATION

This application is continuation of U.S. application Ser. No. 16/236,922, filed Dec. 31, 2018, which claims the benefit under 35 U.S.C § .119(e) of U.S. Provisional Application 62/752,766 filed on Oct. 30, 2018.

TECHNICAL FIELD

The present disclosure generally relates to a memory sub-system, and more specifically, relates to the providing of information for a controller memory buffer (CMB) elasticity status of an elasticity buffer in a memory sub-system to a host system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to providing information for a CMB elasticity buffer of a memory sub-system to a host system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

In a conventional memory sub-system, the host system can provide write operations to store data at the memory sub-system. The write operations can be transmitted from the host system to a buffer memory of the memory sub-system. For example, the buffer memory can store data of multiple write operations that are to be stored at the memory components of the memory sub-system. The memory sub-system can then retrieve the data from the buffer memory and transmit the retrieved data to be stored at the memory components. For example, the memory sub-system can retrieve a portion of the accumulated write operations from the buffer memory and can transmit the corresponding write data to be stored the memory components.

The conventional memory sub-system can receive the write operations from the host system over a first interface and can transmit the write operations from the buffer memory to the memory components over a second interface. For example, the host system can transmit the write operations over a Peripheral Component Interconnect Express (PCIe) interface to the memory sub-system to be stored at the buffer memory. The memory sub-system can then transmit the write data from the buffer memory to the memory components over a different second interface such as a Non-Volatile Memory Express (NVMe) interface. Thus, difference interfaces can be used to receive data from a host system and to store the data at one or more memory components.

If the interface used by the host system to transmit write operations to the memory sub-system is faster than the interface used by the memory sub-system to transmit write data to the memory components, then the accumulation of write operations (issued by the host system) at the memory sub-system can exceed the ability of the memory sub-system to transmit and store the write data at the memory components of the memory sub-system. For example, the host system can transmit write operations over the PCIe interface to the memory sub-system at a faster rate than the memory sub-system can utilize the NVMe interface to store the write data of the write operations at the memory components. Thus, over time, the buffer memory of the memory sub-system can receive more write operations than the memory sub-system is able to write at the memory components. Subsequently, if the buffer memory becomes full and has no further capacity to store the write data (i.e., the data from write operations), then the interface between the host system and the memory sub-system (e.g., the PCIe interface) can become congested. The PCIe interface can be considered to be congested when the write operations from the host system can no longer be stored at the buffer memory of the memory sub-system as a result of the buffer memory being full of previously received write data. As a result of the congestion of the interface, other buffers or memory of the host system will then need to store the write operations that are to be issued by the host system. The host system may attempt repeated memory write retries over the PCIe interface for slower than host speed memory that are larger than 2× to 3× the maximum Transaction Layer Packet (TLP) size of the PCI interface that the PCIe interface can absorb before a no acknowledgement is issued. These repeated retries substantially lower the transfer efficiency for host system burst transfers larger than 2× to 3× of the maximum TLP size.

Aspects of the present disclosure address the above and other deficiencies by providing information of a CMB elasticity buffer of a memory sub-system to a host system. The CMB elasticity buffer can be a buffer or memory component that is included in the memory sub-system. The CMB elasticity buffer can be external to the controller of the memory sub-system and can be directly accessible to the host system For example, the host system can access certain data of the CMB elasticity buffer without requesting the data from the controller of the memory sub-system. Furthermore, the CMB elasticity buffer can store write operations from the host system that have been transmitted over the PCIe interface. The stored write operations can then be executed from the CMB elasticity buffer to store data at the memory components by retrieving the data from the CMB elasticity buffer and transmitting the data from the CMB elasticity buffer via NVMe interface to the memory components.

The memory sub-system can expose or provide one or more characteristics or information of the CMB elasticity buffer to the host system. The host system can then use the provided one or more characteristics of the CMB elasticity buffer to determine when to transmit subsequent write operations over the PCIe interface between the host system and the memory sub-system. For example, the one or more characteristics can specify a size or capacity of the CMB elasticity buffer and a write throughput of the CMB memory area. The size or capacity can specify a number of write operations or amount of write data that can be stored at the CMB elasticity buffer. The write throughput of the CMB memory area can specify a number of write operations or amount of write data that can be transmitted from the CMB elasticity buffer to store data at the CMB memory area components over a particular period of time. For example, the write throughput can specify an amount of the write data or number of write operations that can be transmitted over an NVMe interface over a defined period of time (i.e., a bandwidth of the NVMe interface).

The size or capacity of the CMB elasticity buffer and the write throughput of the CMB memory area components can be provided or exposed to the host system. For example, the characteristics of the CMB elasticity buffer and CMB memory area components can be stored at a memory element (i.e., a register) that is directly accessible to the host system. Subsequently, the host system can calculate or determine an amount of time that is needed for write operations to be retrieved from the CMB elasticity buffer and stored at the CMB memory area components. For example, the amount of time determined by the host system can specify an amount of time that is needed for a group of write operations (e.g., a burst of write operations over the PCIe interface from the host system) to be stored at the CMB elasticity buffer and entirely removed from the CMB elasticity buffer after being committed to be stored at the CMB memory area components of the memory sub-system. Thus, the host system can receive information of the CMB elasticity status and can determine an amount of time for the write operations to be committed and stored at the memory components via the NVMe interface.

The host system can utilize the amount of time to determine when to issue a next group of write operations over the PCIe interface to the memory sub-system. For example, the host system can transmit the write operations to the memory sub-system over the PCIe interface based on the determined amount of time for write operations to be transmitted from the CMB elasticity buffer to the memory components over the NVMe interface. As such, since the host system can issue write operations to the memory sub-system based on a rate of other write operations being removed from the CMB elasticity buffer, the available capacity of the CMB elasticity buffer can store the write data to be issued by the host system. As a result, congestion of the PCIe interface can be prevented as write operations are not issued by the host system without the CMB elasticity buffer having the available capacity to store the write operations.

Advantages of the present disclosure include, but are not limited to, a prevention of congestion at the interface (e.g., PCIe) between the host system and the memory sub-system. The prevention of the congestion can improve the overall performance of the memory sub-system. For example if the capacity of the CMB elasticity buffer capacity is 256 KB, and the CMB memory throughput is 2 GB/s, then the host system can write up to 64×4 KB transfers, wait for a period of time (e.g., 256 KB divided by 2 GB/s=125 ms), and then poll the memory sub-system to determine if the data of the writes from the host system have been committed to the CMB. If so, then the host system can write another burst of write data.

Figure 1A:
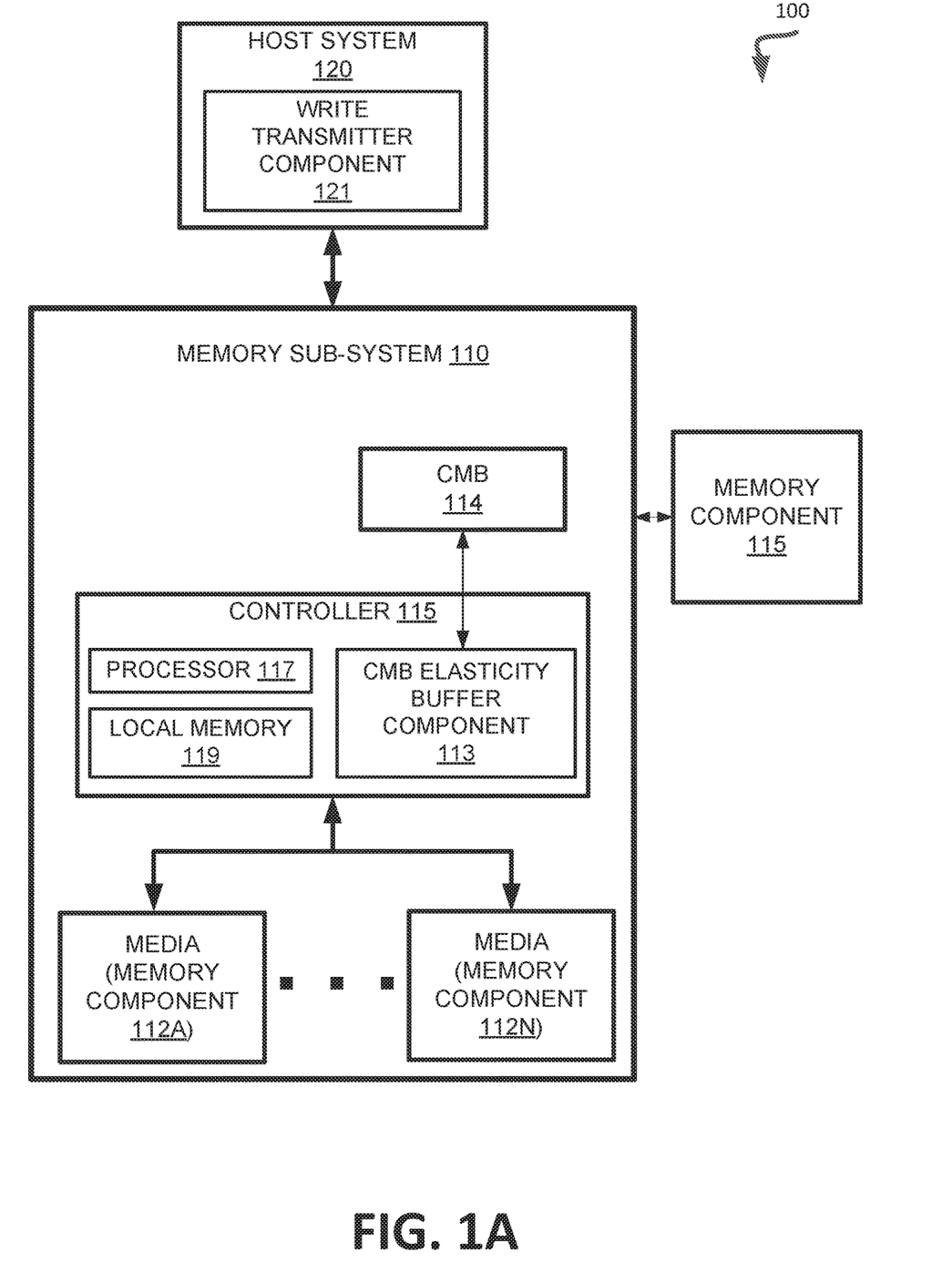
FIG. 1A illustrates an example computing environment that includes a memory sub-system in accordance with some embodiments of the present disclosure.

FIG. 1A illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), cross-point array of non-volatile memory cells, or other storage class memories (SCMs). A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a CMB 114 and a CMB elasticity buffer component 113 that can provide information of t CMB elasticity buffer to the host system 120. In some embodiments, the controller 115 includes at least a portion of the CMB elasticity buffer component 113. For example, the controller 115 can include a processor 117 (processing device) configured to execute instructions stored in local memory 119 for performing the operations described herein. In some embodiments, the CMB elasticity buffer component 113 is part of the host system 120, an application, or an operating system, or is external from the controller 115. For example, the CMB elasticity buffer component 113 can be a memory component that is coupled between the host system 120 and the controller 110 within the memory sub-system 110.

The CMB elasticity buffer component 113 can provide information of a CMB elasticity buffer to the host system 120. The information can specify a capacity of the CMB elasticity buffer that is utilized by the CMB and a write throughput of the CMB memory area. As used herein, the CMB memory area can refer to one or more memory components that are used to store data that is present at the CMB elasticity buffer. For example, the memory component 115 can be a memory component of the CMB memory area. In some embodiments, the memory component 115 can be a dynamic random access memory (DRAM) or a storage class memory (SCM). The host system 120 can further include a write transmitter component 121 that can receive the information and determine an amount of time to transmit groups of write operations to the memory sub-system 110. Further details with regards to the operations of the CMB elasticity buffer component 113 and the write transmitter component 121 are described below.

Figure 1B:
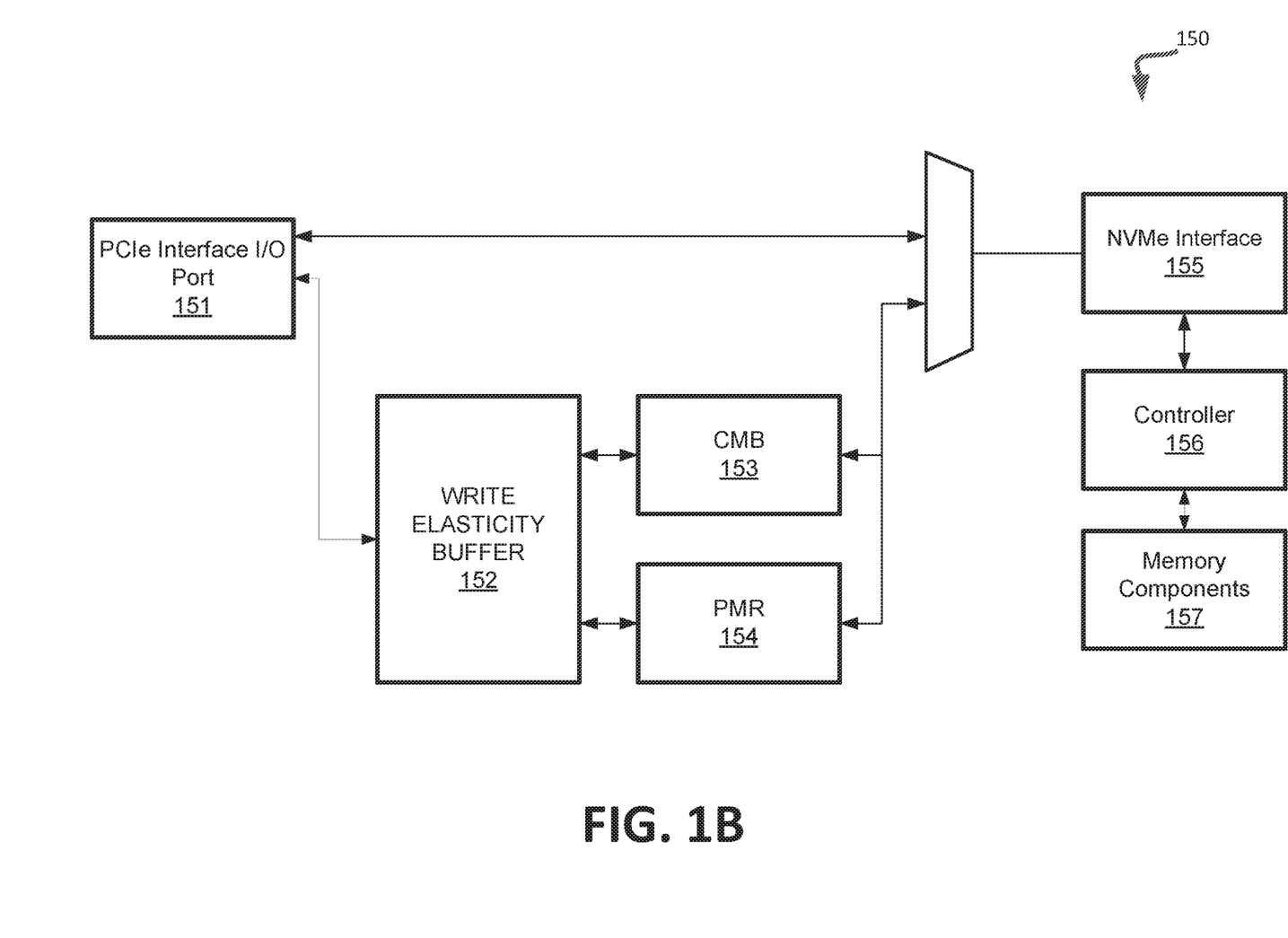
FIG. 1B illustrates an example data path in accordance with some embodiments of the present disclosure.

FIG. 1B illustrates an example data path 150 in accordance with some embodiments of the present disclosure. As shown, the data path 150 can include a PCIe interface input/output (I/O) port 151 that receives and transmits data. The write elasticity buffer 152 can be utilized for a CMB 153. In some embodiments, the write elasticity buffer 152 can be utilized for a Persistent Memory Buffer (PMR) 154. The PMR 154 can be used with respect to non-volatile memory. For example, the PMR memory area can be one or more non-volatile memory components. Operations and aspects of the present disclosure that refer to CMB can also be used with the PMR 154. Thus, the operations and use of an elasticity buffer as described herein can be used for a CMB elasticity buffer or a PMR elasticity buffer. The write elasticity buffer 152 can be bypassed when a read operation is received via the PCIe interface I/O port 151. The data path 150 can further include a remote direct memory access (RDMA). The NVMe interface 155 can be coupled with the controller 156 of a memory sub-system that includes one or more memory components 157. In some embodiments, read buffers and write buffers can be between each of the CMB 153, PCIe interface I/O port 151, and PMR 154 and the multiplexer before the NVMe interface 155.

Figure 2:
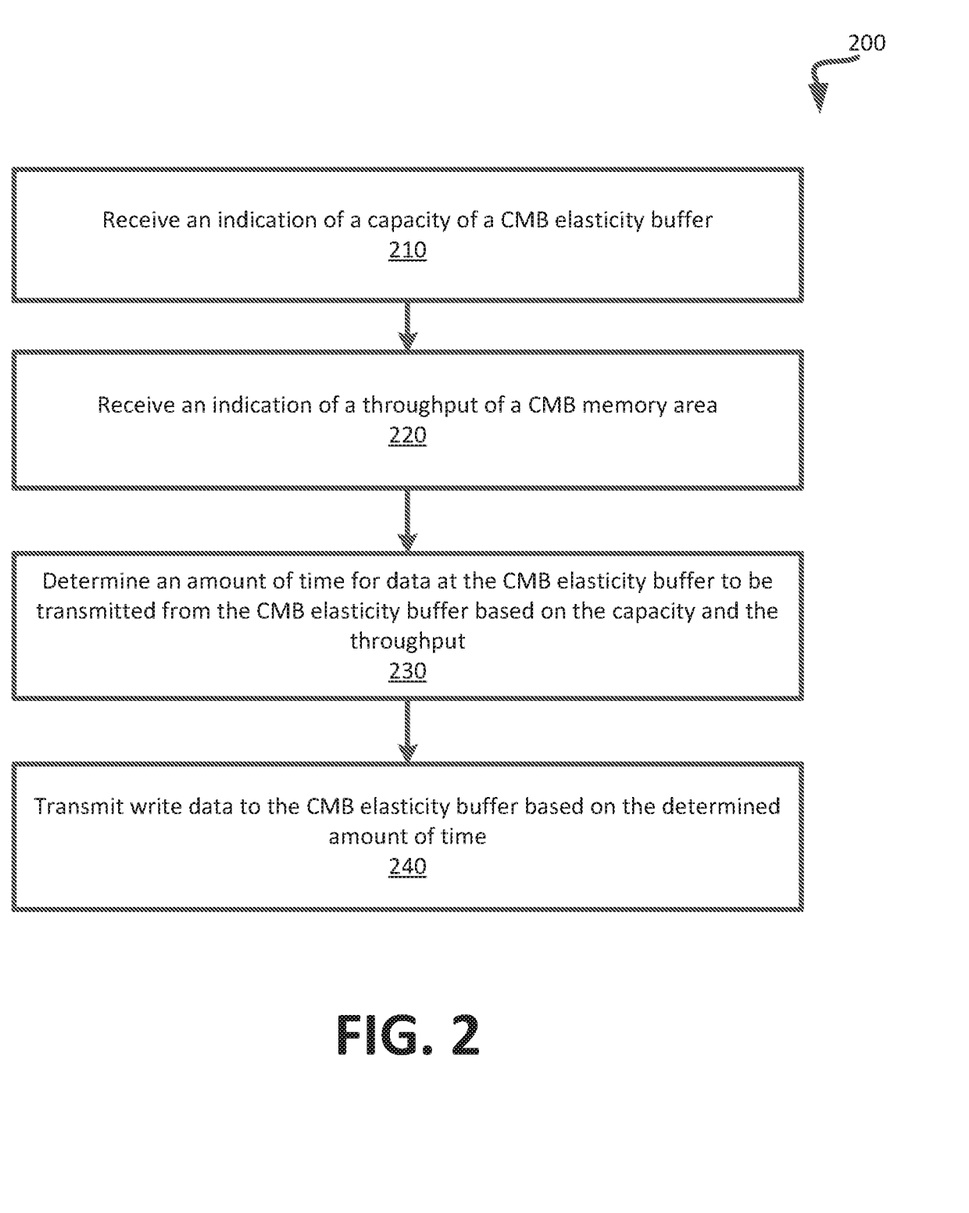
FIG. 2 is a flow diagram of an example method to transmit write data based on information of a CMB elasticity buffer in accordance with some embodiments.

FIG. 2 is a flow diagram of an example method 200 to transmit write data based on information of a CMB elasticity buffer in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the write transmitter component 121 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives an indication of a capacity of a CMB elasticity buffer. At operation 220, the processing logic receives an indication of a throughput of the CMB memory area. The throughput of the CMB memory area can be a throughput of one or more memory components of the CMB memory area. The indications can be received when a host system is to store data at a memory sub-system. For example, the host system can issue write operations to store data at the memory sub-system. The host system can be coupled with the memory sub-system by a PCIe interface. The indication of the capacity and the throughput of the CMB elasticity status can be retrieved by the host system from one or more memory elements (e.g., registers) of the CMB elasticity buffer. For example, the host system can directly access (e.g., without utilizing a controller) the memory elements that store the indication of the capacity and the throughput of the CMB elasticity status. In some embodiments, the indications can be received when the host system initially detects the memory sub-system over the PCIe interface. The indications can be received over the PCI interface.

At operation 230, the processing logic determines an amount of time for data at the CMB elasticity buffer to be transmitted from the CMB elasticity buffer based on the capacity and the throughput. In some embodiments, the amount of time can be an offload timeout calculation to notify the host system of the reserve capacity of the CMB elasticity buffer. For example, the host system can calculate the amount of time at which data is transmitted and removed from the CMB elasticity buffer based on a combination of the CMB elasticity buffer capacity and the CMB memory area throughput. The determined amount of time can be the capacity of the CMB elasticity buffer divided by the throughput of the CMB memory area. In some embodiments, the host system can issue write operations over the PCIe interface based on previous write data that were transmitted to the CMB elasticity buffer being removed from the CMB elasticity buffer and committed to be stored at one or more CMB memory area components.

In some embodiments, an initial number of write operations can be transmitted or issued by the host system based on the capacity of the CMB elasticity buffer. For example, the number of write operations that are initially issued or transmitted by the host system can satisfy or fill the capacity of the CMB elasticity buffer. For example, the amount of write data of the initial number of write operations can fill the capacity of the CMB elasticity buffer. The write data that was initially transmitted or issued by the host system can be removed from the CMB elasticity buffer as the write data is committed by the memory sub-system. The write data can be considered to be committed when the write data has been retrieved or removed from the CMB elasticity buffer and is to be or is currently being written or flushed to the CMB memory area components of the memory sub-system.

At operation 240, the processing logic transmits write data to the CMB elasticity buffer based on the determined amount of time. The host system can issue or transmit the write operations to the CMB elasticity buffer after the determined amount of time elapses. For example, the host system can issue or transmit the write operations after the determined amount of time elapses since the prior write operations were issued or transmitted to the CMB elasticity buffer. Thus, a first group (i.e., a burst) of write operations can be issued or transmitted from the host system. The host system can then issue or transmit a second group (i.e., another burst) of write operations after the determined amount of time elapses. As such, the host system can periodically transmit the next group of write operations when the determined amount of time elapses.

In some embodiments, the host system can perform a polling operation on the CMB elasticity buffer after the determined amount of time elapses and can issue the subsequent group of write operations based on the results of the polling operation. For example, the polling operation can be a retrieving of data or a status indicator stored at a particular memory element (e.g., a register) of the CMB elasticity buffer. The particular register can store a status indicator of the prior group of write data that was transmitted from the host system to the memory sub-system (e.g., over the PCIe interface). The status indicator can identify whether the prior group of write data (i.e., the prior burst) from the write operations has been committed and stored at the memory components over the interface between the CMB elasticity buffer and the memory components (e.g., the NVMe interface). In some embodiments, the status indicator can further indicate whether the write data has been stored without errors and are persistent (e.g., stored at the memory components). If the status indicator identifies that the write data of the prior group of write operations has been committed, then the host system can proceed with transmitting a next group of write operations over the PCIe interface to the memory sub-system. Otherwise, if the status indicator identifies that the prior group of write operations has not been committed, then the host system can wait to transmit the next group of write operations over the PCIe interface. For example, the host system can pause or halt transmitting write operations for a threshold amount of time until performing a next polling operation of the particular register. The utilization of the polling operation can ensure that the write data that was previously transmitted by the host system has been successfully stored at the memory components before the host system transmits subsequent write data.

Figure 3:
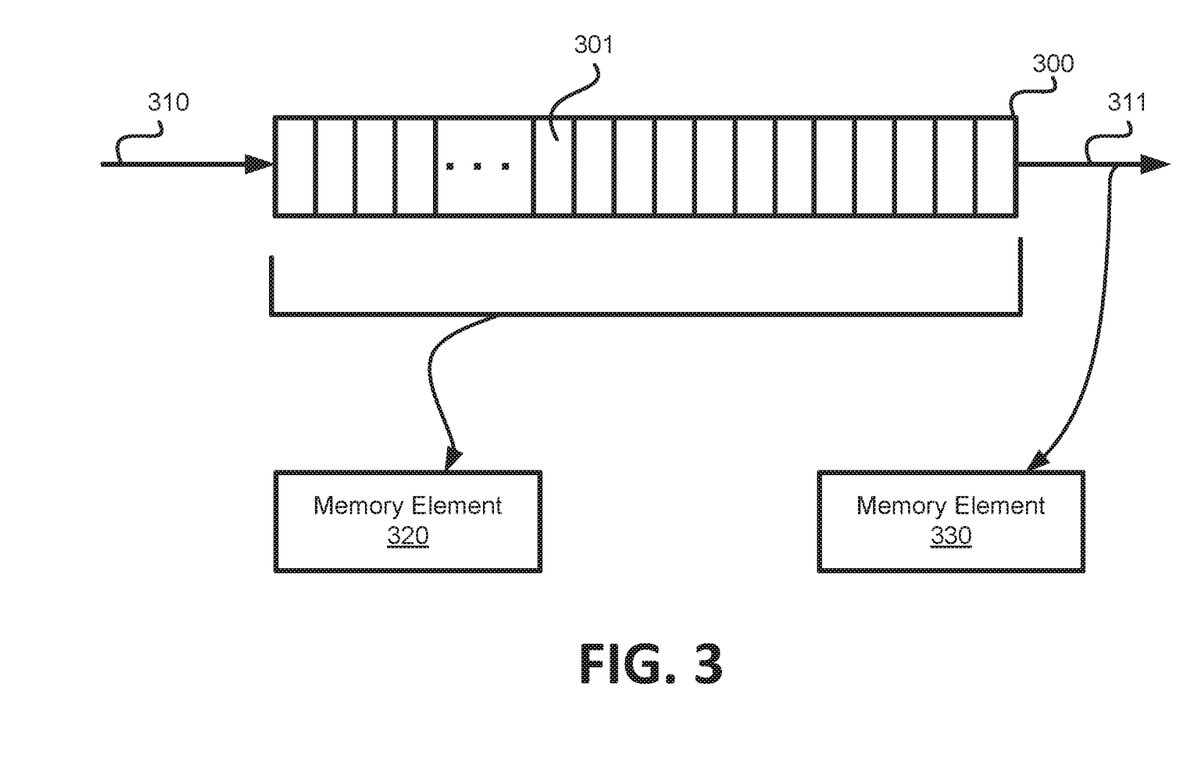
FIG. 3 illustrates a CMB elasticity buffer in accordance with some embodiments of the present disclosure.

FIG. 3 illustrates a CMB elasticity buffer 300 in accordance with some embodiments of the present disclosure. In some embodiments, the CMB elasticity buffer 300 can correspond to the CMB elasticity buffer component 113 of the controller 115 of FIG. 1A.

As shown in FIG. 3, the CMB elasticity buffer 300 can store write data 301. For example, a host system can transmit write data 301 via a first interface 310 (e.g., a PCIe interface) to the CMB elasticity buffer 300 of a memory sub-system. The CMB elasticity buffer 300 can store the write data 301 as the host system transmits or issues write operations over the first interface 310. The write data 301 stored at the CMB elasticity buffer 300 can be removed and transmitted over the second interface 311 (e.g., an NVMe interface) to be stored at one or more memory components of the memory sub-system. For example, the write data 301 can be removed from the CMB elasticity buffer 300 as corresponding write operations are being committed or transmitted over the second interface 311.

The CMB elasticity buffer 300 can include additional memory elements 320 and 330. The memory elements 320 and 330 can be part of the CMB elasticity buffer 300 or can be additional registers or other such memory components that are coupled with the CMB elasticity buffer 300. The memory element 320 can store an indication of the capacity of the CMB elasticity buffer 300 and the memory element 330 can store an indication of the throughput of the write data 301 from the CMB elasticity buffer 300 over the second interface 311 to the CMB memory area components.

In some embodiments, the memory element 320 and the memory element 330 can store predefined or specified values for the CMB elasticity buffer capacity and the throughput of the CMB memory area components 300. For example, the predefined or specified values can be programmed or stored at the memory elements 320 and 330 at manufacture of the memory sub-system. The memory elements 320 and 330 can be read-only registers. In some embodiments, the memory sub-system can store the values at the memory elements 320 and 330. For example, the memory sub-system can detect the capacity and throughput of the CMB elasticity buffer 300 and can store the detected values at the memory elements 320 and 330. In some embodiments, the memory sub-system can update the values to new values if the memory sub-system detects that the capacity or throughput of the CMB elasticity buffer 300 has changed. For example, the values can be updated if a portion of the CMB memory area components 300 can no longer store write data or if the throughput via the second interface 311 changes. The memory elements 320 and 330 can be accessible to the host system without requesting the data stored at the memory elements 320 and 330 from the controller of the memory sub-system. For example, the memory elements 320 and 33 can be directly accessible to the host system.

Figure 4:
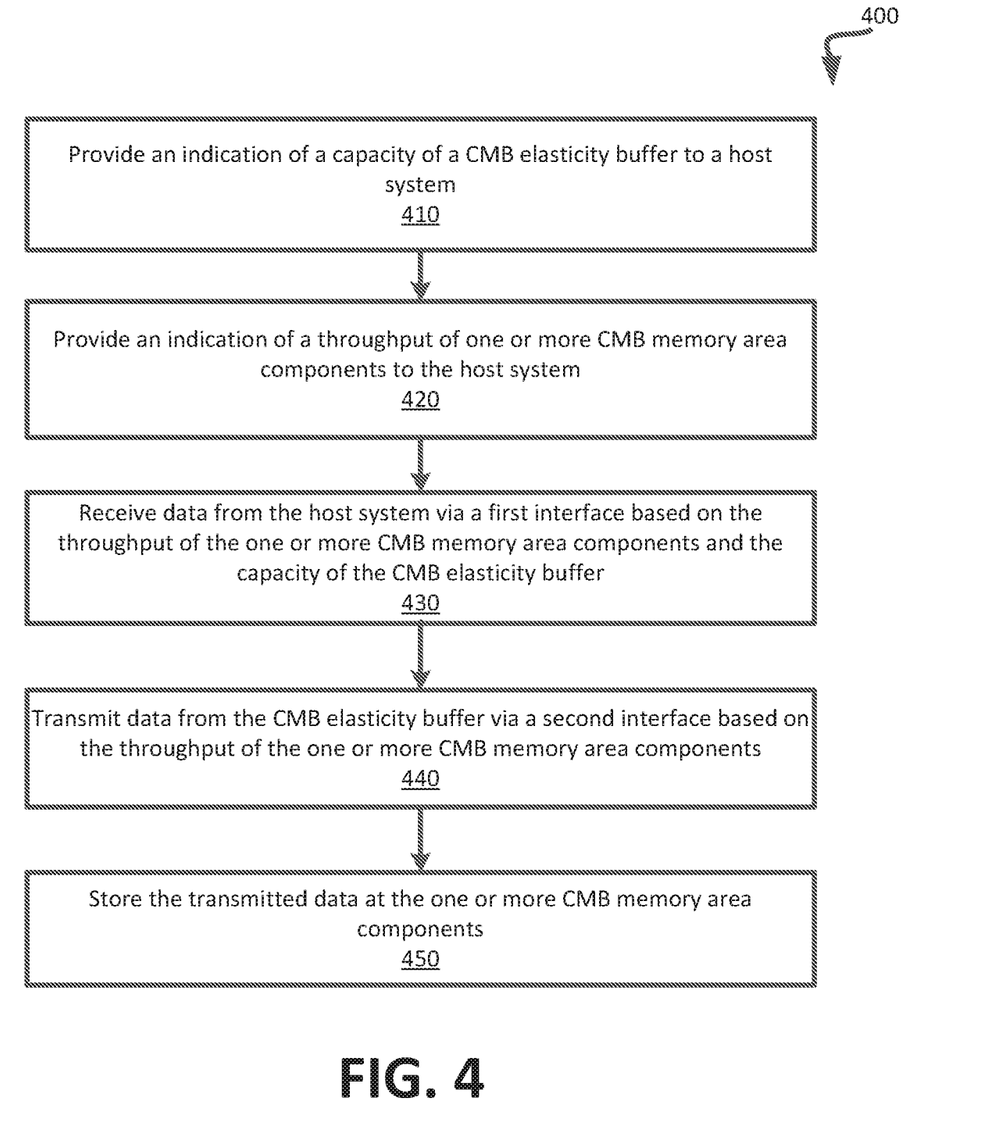
FIG. 4 is a flow diagram of an example method to provide information of a CMB elasticity buffer in accordance with some embodiments of the present disclosure.

FIG. 4 is a flow diagram of an example method 400 to provide information of a CMB elasticity buffer in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the CMB elasticity buffer component 113 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic provides an indication of a capacity of a CMB elasticity buffer to a host system. For example, a register or other such memory element can be made accessible to the host system. The register or memory element can store a value that indicates the capacity of the CMB elasticity buffer. The capacity can indicate the maximum number of write operations or maximum amount of write data that can be stored at the CMB elasticity buffer at a particular time. At operation 420, the processing logic provides an indication of a throughput of one or more CMB memory area components to the host system. For example, the same or another register or memory element can be made accessible and can store a value that indicates the throughput of the memory components of the CMB memory area.

At operation 430, the processing logic receives data from a host system via a first interface based on the throughput of the one or more CMB memory area components and the capacity of the CMB elasticity buffer. The capacity and the throughput can indicate a CMB elasticity status. For example, write data that is to be stored at the CMB elasticity buffer can be received from a PCIe interface at a rate that is based on the capacity and the throughput of the CMB elasticity status. In some embodiments, the rate can be the amount of time that write data stored at the CMB elasticity buffer at full capacity can be fully transmitted and removed from the CMB elasticity buffer as the write data is committed at memory components. The data received from the host system via the first interface can be stored at the CMB elasticity buffer. At operation 440, the processing logic transmits data from the CMB elasticity buffer via a second interface based on the throughput of the one or more CMB memory area components. For example, an amount of write data can be transmitted at a rate defined by the throughput.

At operation 450, the processing logic stores the transmitted data at the one or more CMB memory area components. For example, the write data that was transmitted from the CMB elasticity buffer can be stored at memory components of the memory sub-system. The write data can be stored at the memory components after being transmitted over the second interface.

As such, the CMB elasticity buffer can store write data received from a host system via a first interface and can transmit stored write data to one or more memory components via a second interface. The rate of transmitting of data via the first interface can exceed the rate of transmitting of data via the second interface. For example, the memory components utilizing the second interface can utilize a larger amount of time to store data than the host system can transmit data over the first interface. The characteristics (e.g., the capacity and throughput) of the CMB elasticity status can be provided to the host system to control when the host system is to transmit subsequent write data to the CMB elasticity buffer.

Figure 5:
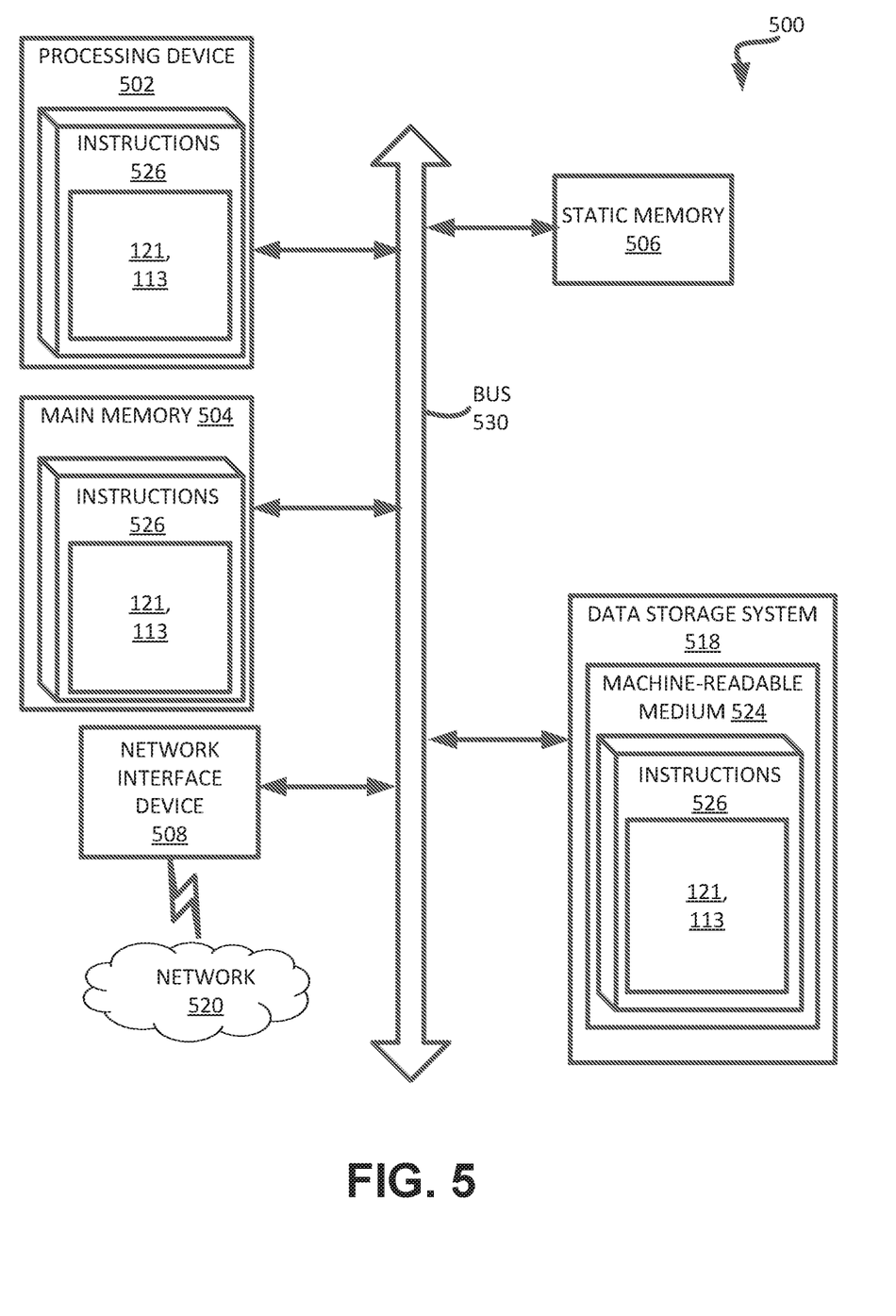
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the write transmitter component 121 or the CMB elasticity buffer component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1A.

In one embodiment, the instructions 526 include instructions to implement functionality corresponding to a write transmitter component or a CMB elasticity buffer component (e.g., the write transmitter component 121 or a CMB elasticity buffer component 113 of FIG. 1A). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    providing, by a processing device to a host system over a first interface, an indication of a capacity of a controller memory buffer (CMB) elasticity buffer and a throughput of a CMB memory area corresponding to a memory component coupled to the processing device over a second interface, wherein the indication of the capacity is provided from a first programmable memory element, and the throughput is provided from a second programmable memory element;
    receiving, by the processing device, data from the host system over the first interface at a rate based on the capacity of the CMB elasticity buffer and the throughput of the CMB memory area, wherein the rate comprises an amount of time to send write data stored at the CMB elasticity buffer at full capacity over the second interface and remove the write data from the CMB elasticity buffer as the write data is stored at the memory component of the CMB memory area, and the amount of time is based on the capacity of the CMB elasticity buffer divided by the throughput of the CMB memory area;
    storing the data at the CMB elasticity buffer; and
    sending the data from the CMB elasticity buffer over the second interface to be stored at the memory component of the CMB memory area based on the throughput of the CMB memory area.

2. The method of claim 1, wherein the first interface is a Peripheral Component Interconnect express (PCIe) interface, and wherein the second interface is a Non-Volatile Memory express (NVMe) interface.

3. The method of claim 1, wherein the first interface is associated with a higher throughput than the throughput of the CMB elasticity buffer over the first interface.

4. The method of claim 1, wherein the first programmable memory element comprises a first read-only register, the second programmable memory element comprises a second read-only register, and providing the indication of the capacity of the CMB elasticity buffer and the throughput of the CMB memory area comprises:
    storing the indication of the capacity of the CMB elasticity buffer in the first read-only register;
    storing the throughput of the CMB memory area in the second read-only register; and
    providing access to the first and second read-only registers to the host system over the first interface.

5. The method of claim 1, further comprising updating a status of the data in response to the sending the data from the CMB elasticity buffer over the second interface, wherein the status indicates whether the data has been removed from the CMB elasticity buffer and is to be stored at the memory component.

6. The method of claim 1, wherein the capacity of the CMB elasticity buffer corresponds to an amount of write data from the host system that can be stored at the CMB elasticity buffer.

7. A non-transitory computer-readable storage medium comprising instructions that, when executed by a processing device of a memory sub-system controller, cause the processing device to perform operations comprising:
    providing, to a host system over a first interface, an indication of a capacity of a controller memory buffer (CMB) elasticity buffer and a throughput of a CMB memory area corresponding to a memory component coupled to the processing device over a second interface, wherein the indication of the capacity is provided from a first programmable memory element, and the throughput is provided from a second programmable memory element;
    receiving data from the host system over the first interface at a rate based on the capacity of the CMB elasticity buffer and the throughput of the CMB memory area, wherein the rate comprises an amount of time to send write data stored at the CMB elasticity buffer at full capacity over the second interface and remove the write data from the CMB elasticity buffer as the write data is stored at the memory component of the CMB memory area, and the amount of time is based on the capacity of the CMB elasticity buffer divided by the throughput of the CMB memory area;
    storing the data at the CMB elasticity buffer; and
    sending the data from the CMB elasticity buffer over the second interface to be stored at the memory component of the CMB memory area based on the throughput of the CMB memory area.

8. The non-transitory computer-readable storage medium of claim 7, wherein the first interface is a Peripheral Component Interconnect express (PCIe) interface, and wherein the second interface is a Non-Volatile Memory express (NVMe) interface.

9. The non-transitory computer-readable storage medium of claim 7, wherein the first interface is associated with a higher throughput than the throughput of the CMB elasticity buffer over the first interface.

10. The non-transitory computer-readable storage medium of claim 7, wherein the first programmable memory element comprises a first read-only register, the second programmable memory element comprises a second read-only register, and providing the indication of the capacity of the CMB elasticity buffer and the throughput of the CMB memory area comprises:
    storing the indication of the capacity of the CMB elasticity buffer in the first read-only register;
    storing the throughput of the CMB memory area in the second read-only register; and
    providing access to the first and second read-only registers to the host system over the first interface.

11. The non-transitory computer-readable storage medium of claim 7, the operations further comprise updating a status of the data in response to the sending the data from the CMB elasticity buffer over the second interface, wherein the status indicates whether the data has been removed from the CMB elasticity buffer and is to be stored at the memory component.

12. The non-transitory computer-readable storage medium of claim 7, wherein the capacity of the CMB elasticity buffer corresponds to an amount of write data from the host system that can be stored at the CMB elasticity buffer.

13. A system comprising:
a controller memory buffer (CMB) elasticity buffer; and
a processing device, operatively coupled with the CMB elasticity buffer, to:
provide, to a host system over a first interface, an indication of a capacity of the CMB elasticity buffer and a throughput of a CMB memory area corresponding to a memory component coupled to the processing device over a second interface, wherein the indication of the capacity is provided from a first programmable memory element, and the throughput is provided from a second programmable memory element;
receive data from the host system over the first interface at a rate based on the capacity of the CMB elasticity buffer and the throughput of the CMB memory area, wherein the rate comprises an amount of time to send write data stored at the CMB elasticity buffer at full capacity over the second interface and remove the write data from the CMB elasticity buffer as the write data is stored at the memory component of the CMB memory area, and the amount of time is based on the capacity of the CMB elasticity buffer divided by the throughput of the CMB memory area;
store the data at the CMB elasticity buffer; and
send the data from the CMB elasticity buffer over the second interface to be stored at the memory component of the CMB memory area based on the throughput of the CMB memory area.

14. The system of claim 13, wherein the first interface is a Peripheral Component Interconnect express (PCIe) interface, and wherein the second interface is a Non-Volatile Memory express (NVMe) interface.

15. The system of claim 13, wherein the first interface is associated with a higher throughput than the throughput of the CMB elasticity buffer over the first interface.

16. The system of claim 13, wherein the first programmable memory element comprises a first read-only register, the second programmable memory element comprises a second read-only register, and providing the indication of the capacity of the CMB elasticity buffer and the throughput of the CMB memory area comprises:
storing the indication of the capacity of the CMB elasticity buffer in the first read-only register;
storing the throughput of the CMB memory area in the second read-only register; and
providing access to the first and second read-only registers to the host system over the first interface.

17. The system of claim 13, wherein the first programmable memory element comprises a first register, the second programmable memory element comprises a second register, and providing the indication of the capacity of the CMB elasticity buffer and the throughput of the CMB memory area comprises:
storing the indication of the capacity of the CMB elasticity buffer in the first register; and
storing the throughput of the CMB memory area in the second register, wherein the first and second registers are directly accessible to the host system without utilizing the processing device to access the first and second registers.

18. The system of claim 13, wherein the processing device is further to:
in response to transmitting the data from the CMB elasticity buffer over the second interface, update a status of the data, wherein the status indicates whether the data has been removed from the CMB elasticity buffer and is to be stored at the memory component.

19. The system of claim 18, wherein the status further indicates whether the data has been stored at the memory component without errors.

20. The system of claim 13, wherein the capacity of the CMB elasticity buffer corresponds to an amount of write data from the host system that can be stored at the CMB elasticity buffer.

* * * * *